(12) United States Patent  (10) Patent No.: US 8,737,914 B2
Hill  (45) Date of Patent: May 27, 2014

(54) COMMUNICATION SYSTEM WITH NFC TRANSFER OF DIFFERENT DATA SETS BASED UPON KEYBOARD MODE AND RELATED METHODS

(75) Inventor: Thomas C. Hill, Crystal Lake, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 535 days.

(21) Appl. No.: 13/036,532

(22) Filed: Feb. 28, 2011

(65) Prior Publication Data

US 2012/0220225 A1  Aug. 30, 2012

(51) Int. Cl.
*H04B 5/00*  (2006.01)

(52) U.S. Cl.
USPC ........................................................ 455/41.1

(58) Field of Classification Search
USPC ........................................................ 455/41.1
See application file for complete search history.

(56) References Cited

U.S. PATENT DOCUMENTS

| | | | |
|---|---|---|---|
| 7,702,282 B2 | 4/2010 | Sandegard et al. | 455/41.2 |
| 2007/0042807 A1* | 2/2007 | Khoo | 455/557 |
| 2008/0039212 A1 | 2/2008 | Ahlgren et al. | 463/45 |
| 2009/0144435 A1* | 6/2009 | Naniyat | 709/228 |
| 2010/0041332 A1* | 2/2010 | Flygh et al. | 455/41.1 |
| 2010/0221999 A1* | 9/2010 | Braun et al. | 455/41.1 |
| 2011/0169729 A1* | 7/2011 | Holleis et al. | 345/156 |

FOREIGN PATENT DOCUMENTS

| | | | | |
|---|---|---|---|---|
| WO | 2010/018468 | 2/2010 | | H04M 1/725 |
| WO | 2010/101755 | 9/2010 | | H04M 1/725 |

OTHER PUBLICATIONS

Jefferson et al, "*The Human Chain puts NFC form factors to the test in latest White Paper*" Aug. 28, 2009.
"*Apple Getting Serious About Near Field Communication on the iPhone*" http://www.patentlyapple.com Feb. 18, 2010: Printed Oct. 5, 2010.
Bailly et al. "*White Paper: Breakthroughs in the European Mobile Payment Market*"Atos Origin.
Kirovski et al. "*The Martini Synch: Using Accelerometers for Device Pairing*" Microsoft Research.
Pering et al. "*Gesture Connect: Facilitating Tangible Interaction with a Flick of the Wrist*", 2007.
Mover Iphone App: http://infinite-labs.net/mover/ Nov. 23, 2010.
Bump Iphone Application: http://iphone.tmcnet.com/topics/iphone/articles/55072-bump-app-exchanging-contact-info-the-iphone-one.htm Nov. 23, 2010.
"Towards a Secure Internet of Things made of RFID/NFC" http://www.comics.unina.it/index.php?option=com_content&task=view& id=226&Itemid=1: Printed Jan. 28, 2011.
"Fonelabs launches range of low-cost NFC phones" http://www.nearfieldcommunicationsworld.com/2009/03/12/3856/fonelabs-launches-range-of-low-cost-nfcphones; Printed Jan. 28, 2011.
"Flip n Shake light" http://uk.androlib.com/android.application.com-zosqlabs-androidflipshake-wBBB.aspx printed Feb. 22, 2010.

(Continued)

*Primary Examiner* — David Bilodeau
(74) *Attorney, Agent, or Firm* — Allen, Dyer, Doppelt, Milbrath & Gilchrist, P.A.

(57) ABSTRACT

A communication system may include a near-field communication (NFC) device, and a mobile wireless communications device having different selectable keyboard configuration modes. The mobile wireless communications device may include an NFC circuit, and a controller coupled to the NFC circuit and determining a selected keyboard configuration mode, and selectively communicating a respective set of data from among different sets of data with the NFC device based upon the selected keyboard configuration mode.

21 Claims, 6 Drawing Sheets

(56) References Cited

OTHER PUBLICATIONS

Rukzio et al. Exploring Expressive NFC-Based Mobile Phone Interaction with Large Dynamic Displays Near Field Communication, 2009. NFC '09. First International Workshop: Feb. 24, 2009 pp. 36-41 Abstract: Inherent obstacles (Abstract only).

Thoughts on Nokia's NFC developments By *Timo* |Published: May 7, 2008 Printed Feb. 22, 2011 http://www.nearfield.org/2008/05/thoughts-on-nokias-nfc-developments.
Nokia 6131 NFC User Guide http://nds1.nokia.com/phones/files/guides/Nokia_6131_NFC_UG_en.pdf.
*Timo Arnall* Graphic language for touch Nov. 21, 2005 http://www.elasticspace.com/2005/11/graphic-language-for-touch.

* cited by examiner

COMMUNICATION SYSTEM WITH NFC TRANSFER OF DIFFERENT DATA SETS BASED UPON KEYBOARD MODE AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION OF THE PREFERRED EMBODIMENTS

Figure 1:
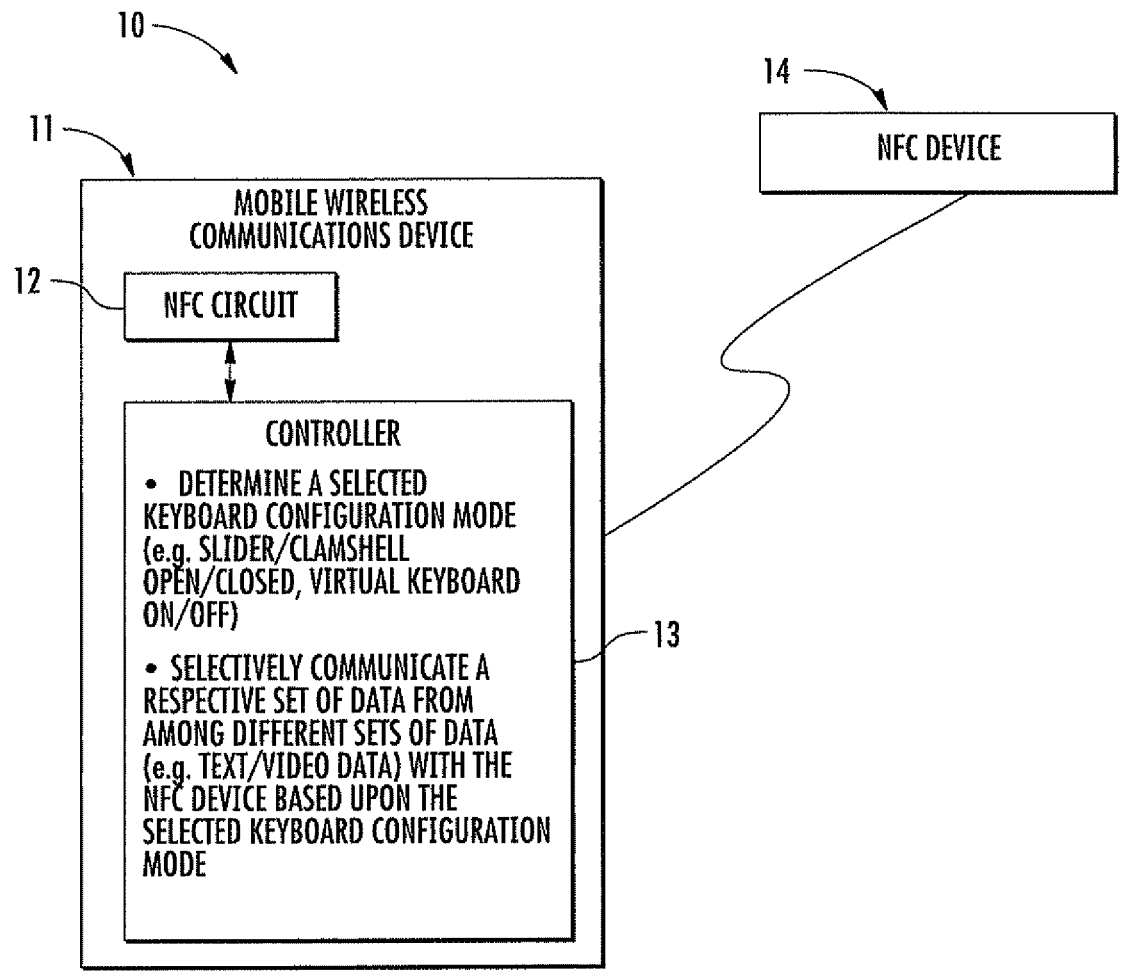
FIG. 1 is a schematic block diagram of an example embodiment of a wireless communication system.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communication system may include at least one NFC device, and at least one mobile wireless communications device having a plurality of different selectable keyboard configuration modes and comprising an NFC circuit, and a controller coupled to the NFC circuit. The controller may be configured to determine a selected keyboard configuration mode, and selectively communicate a respective set of data from among a plurality of different sets of data with the at least one NFC device based upon the selected keyboard configuration mode. Advantageously, the controller may receive the appropriate set of data irregardless of the selected keyboard configuration mode.

In some embodiments, the controller may be configured to receive the respective set of data from the at least one NFC device based upon the selected keyboard configuration mode. In other embodiments, the controller may be configured to transmit the respective set of data to the at least one NFC device based upon the selected keyboard configuration mode. Of course, in other embodiments, the communication may be both transmitting and receiving.

More specifically, the different sets of data may comprise a text set of data and a video set of data. The different sets of data may be associated with a same subject matter, for example, an advertisement. In some embodiments, the controller may be configured to receive at least two different sets of data from the different sets, display a respective set of data from among the at least two different sets of data based upon the selected keyboard configuration mode, and store the other set of data from among the at least two different sets of data.

For example, the at least one NFC device may be associated with a service position, and the different sets of data may be associated with the service position, such a window advertisement or a commercial kiosk. In example embodiments, the at least one mobile wireless communications device may comprise a slider keyboard cooperating with the controller, and the different selectable keyboard configuration modes may comprise a slider keyboard open configuration mode and a slider keyboard closed configuration mode. In other example embodiments, the at least one mobile wireless communications device may comprise a touch screen display, and the different selectable keyboard configuration modes may comprise a virtual keyboard configuration on mode and a virtual keyboard configuration off mode. In yet other example embodiments, the at least one mobile wireless communications device may comprise a first housing carrying the controller and the NFC circuit, a second housing, a hinge coupling the first and second housings, and a clamshell keyboard cooperating with said controller. The different selectable keyboard configuration modes may comprise a clamshell keyboard open configuration mode and a clamshell keyboard closed configuration mode.

Another example aspect is directed to a method of operating a mobile wireless communications device having a plurality of different selectable keyboard configuration modes. The method may comprise determining a selected keyboard configuration mode, and selectively communicating a respective set of data from among a plurality of different sets of data with an NFC device based upon the selected keyboard configuration mode.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 2:
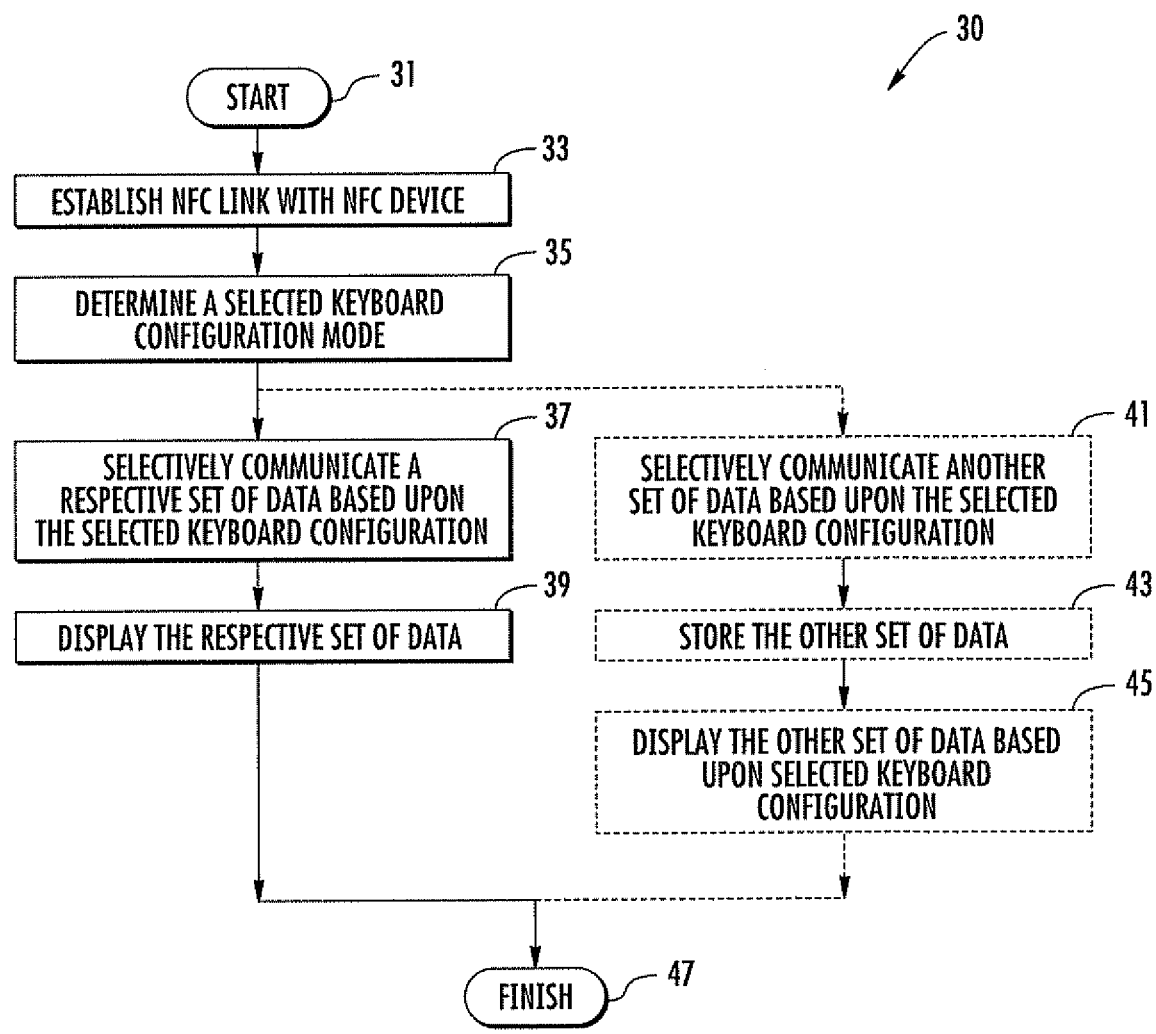
FIG. 2 is a flowchart illustrating operation of the wireless communication system of FIG. 1.
Figure 3:
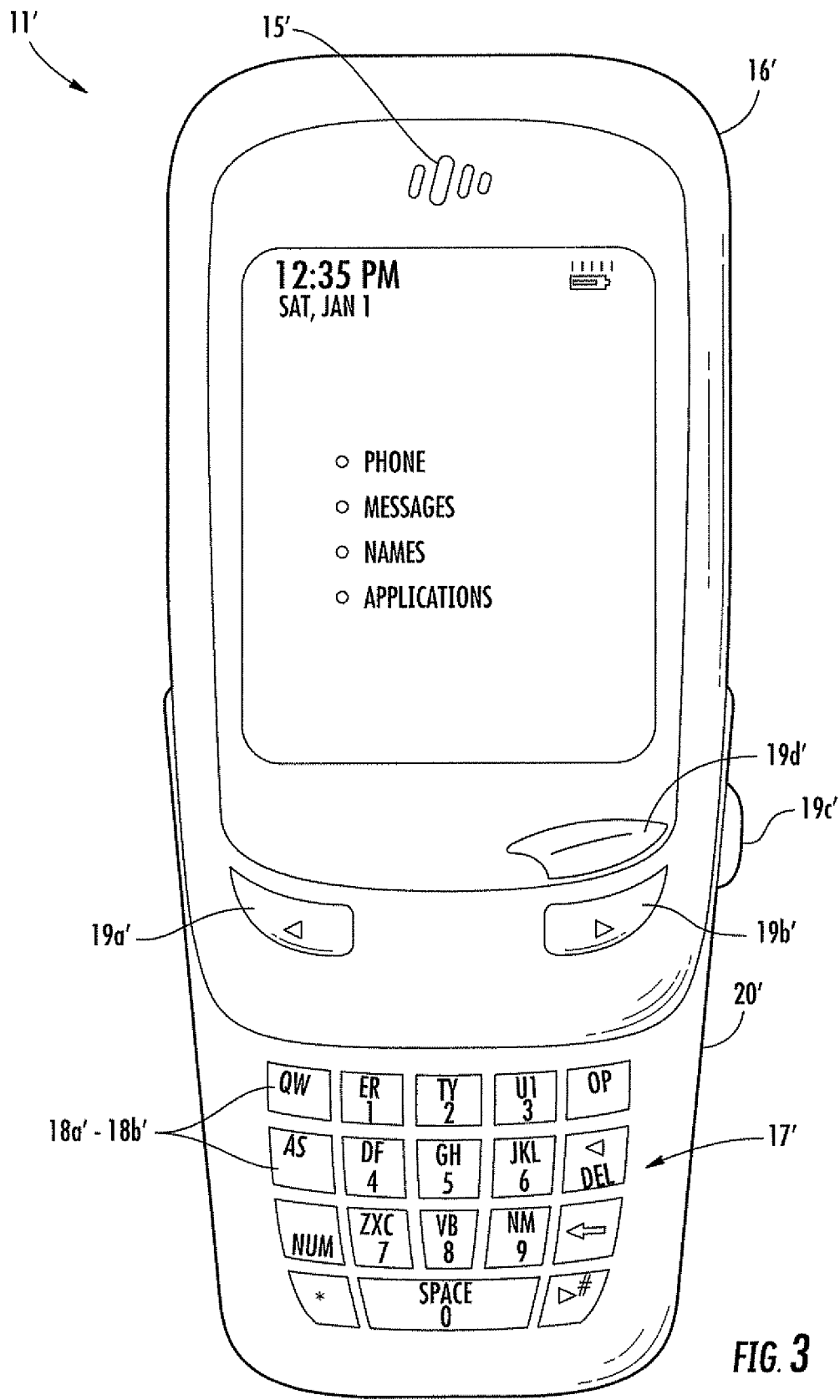
FIG. 3 is a front plan view of an example embodiment of a mobile wireless communications device.
Figure 4:
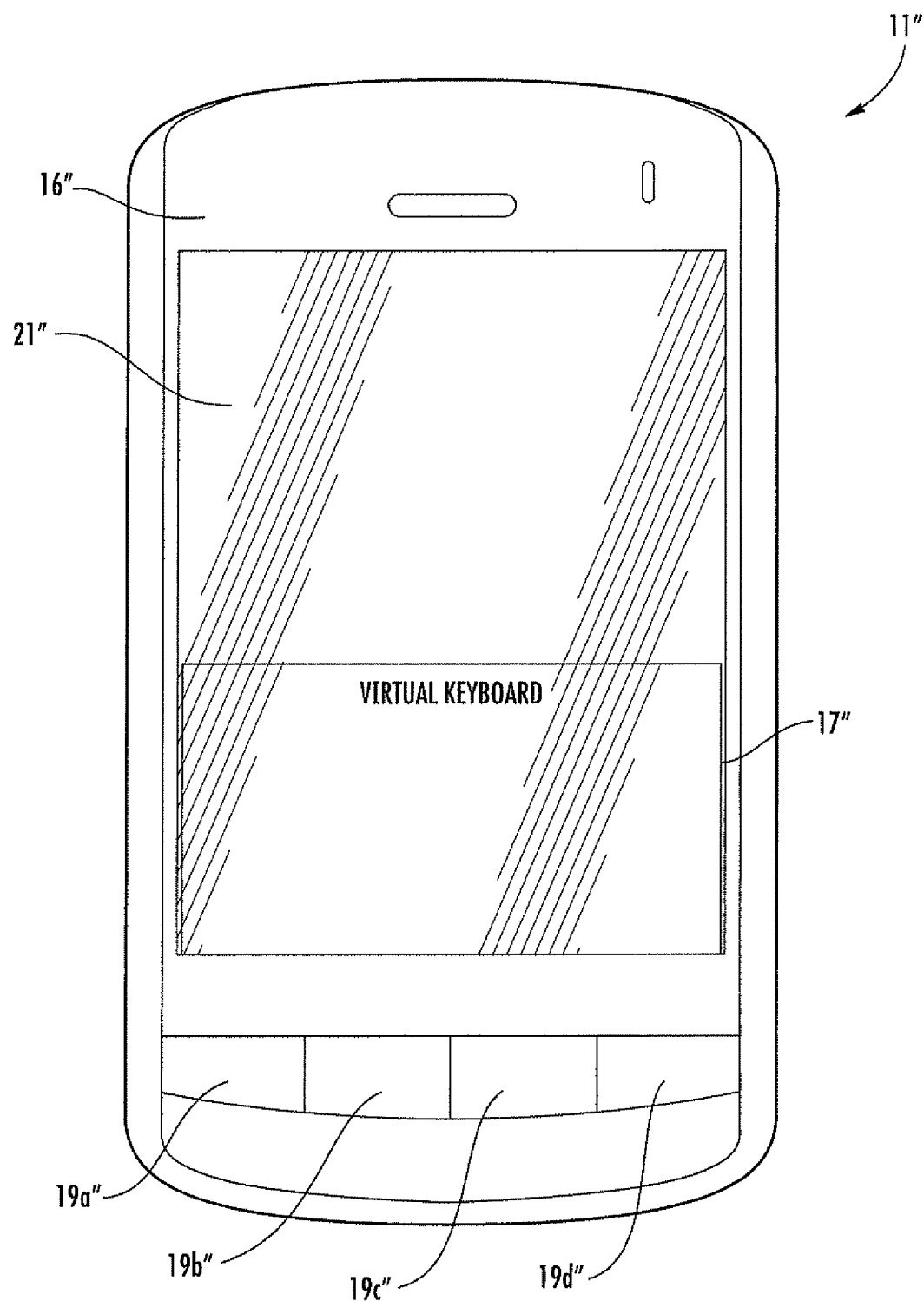
FIG. 4 is a front plan view of another example embodiment of a mobile wireless communications device.

Referring initially to FIGS. 1-2, a wireless communication system 10 according to the present disclosure is now described. Moreover, with reference additionally to FIG. 2, a flowchart 30 illustrates a method of operating the wireless communication system 10 (Block 31). The wireless communication system 10 illustratively includes an NFC device 14, and a mobile wireless communications device 11. The mobile wireless communications device 11 includes an NFC circuit 12, a controller 13 coupled to the NFC circuit, a display (FIGS. 3-4) and a keyboard for receiving inputs (FIGS. 3-4). The mobile wireless communications device 11 has a plurality of different selectable keyboard configuration modes. For example, in embodiments where the keyboard comprises a virtual keyboard, i.e. touch screen embodiments, the different selectable keyboard configuration modes may comprise virtual keyboard on and off modes. In embodiments where the mobile wireless communications device 11 has a slider form factor (FIG. 3), the different selectable keyboard configuration modes may comprise slider keyboard open and closed configuration modes. Yet, in other embodiments where the mobile wireless communications device 11 has a clamshell form factor (FIG. 5), the different selectable keyboard configuration modes may comprise flip keyboard open and closed configuration modes.

The mobile wireless communications device 11 and the NFC device 14 are illustratively in communication, in particular, the exchanging of a plurality of different sets of data (Block 33). For example, the plurality of different sets of data may comprise a text set of data and a video set of data. In some embodiments, the NFC device 14 may be associated with a service position (e.g. a window advertisement), and the different sets of data may be associated with the same subject matter, i.e. the service position (e.g. the different sets of data are associated with the window advertisement and may comprise a digital video advertisement set of data and a text product description set of data).

During operation of the mobile wireless communications device 11, the controller 13 is illustratively configured to determine a selected keyboard configuration mode (Block 35). As typical with normal use, the keyboard of the mobile wireless communications device 11 frequently switches between selected keyboard configuration modes. Depending on the selected keyboard configuration mode, certain types of data are more readily viewed on the display of the mobile wireless communications device 11. Accordingly, the controller 13 is illustratively configured to selectively communicate (transmit to and receive from) a respective set of data from among a plurality of different sets of data with the NFC device 14 based upon the selected keyboard configuration mode (Block 37). In other words, given the current selected keyboard configuration mode, the controller 13 receives the set of data that would most readily be currently displayed by the mobile wireless communications device 11 from the NFC device 14 and then displays such data (Block 39), thereby providing a more pleasing user experience.

In some embodiments (shown with shadowed lines in FIG. 2), the controller 13 may be configured to receive at least two different sets of data from the plurality of different sets (Block 41), and shortly display a respective set of data from among the at least two different sets of data based upon the selected keyboard configuration mode (Block 39). For example, if the keyboard is currently configured that text data is best displayed, the controller 13 receives both the video set of data and the associated text set of data, displaying the text set of data. Subsequent, the controller 13 illustratively stores the other set of data from among the at least two different sets of data for later viewing (Blocks 43 & 45), i.e. the controller displays the video set of data later when the keyboard configuration makes displaying video data advantageous (Block 47).

Of course, since the video data may be associated with the service position of the NFC device 14, which may no longer be useful since the mobile wireless communications device 11 may be in another service position and communicating with another corresponding NFC device, the controller 13 may be configured to delete the stored set of data after a certain time period. Also, the controller can be configured to use other onboard transceivers, such as cellular and WiFi, to download the associated sets of data from the service position even if the mobile wireless communications device 13 moves outside the range of the NFC device 14, which is typically limited. In other words, the controller 13 may coordinate the communication of a portion of the associated sets of data via NFC and the remaining (once the mobile wireless communications device 13 moves outside NFC range) portion via the other onboard transceivers.

In other words, as the mobile wireless communications device 11 encounters other NFC devices 14 and associated service positions, the controller 13 helpfully downloads the most appropriate form of data from a respective NFC device that is most easily viewed on the mobile wireless communications device given its current keyboard configuration mode. Referring again to the aforementioned window advertisement example, as the mobile wireless communications device 11 is swiped at different window advertisements (e.g. at a commercial mall) during use, the most convenient form of the associated set of data is consistently downloaded regardless of the selected keyboard configuration mode.

In some embodiments, the controller 13 may store user preference values for selecting which respective set of data from among a plurality of different sets of data to communicate with the NFC device 14. For example, in touch screen embodiments, the controller 13 can be configured to communicate video sets of data when in the virtual keyboard off mode, i.e. the entire screen is available for display.

Referring now to FIG. 3, another embodiment of the mobile wireless communications device 11' is now described. In this embodiment of the mobile wireless communications device 11', those elements already discussed above with respect to FIGS. 1-2 are given prime notation and most require no further discussion herein. This embodiment differs from the previous embodiment in that the mobile wireless communications device 11' further includes first and second housings 16', 20' reciprocating therebetween via a sliding motion, a slider keyboard 17' including a plurality of keys 18a'-18b' on the second housing cooperating with the controller (not shown), other convenience switches 19a'-19d', and an audio speaker 15' on the first housing. More specifically, in this particular embodiment, the plurality of different selectable keyboard configuration modes comprises a slider keyboard open configuration mode and a slider keyboard closed configuration mode. Advantageously, the controller is configured to selectively receive a respective set of data from among a plurality of different sets of data from the NFC device (not shown). For example, with the slider keyboard 17' in an open position, the controller may retrieve sets of data from the NFC device that may require a full screen or that may require text input.

Referring now to FIG. 4, another embodiment of the mobile wireless communications device 11" is now described. In this embodiment of the mobile wireless communications device 11", those elements already discussed above with respect to FIGS. 1-2 are given double prime notation and most require no further discussion herein. This embodiment differs from the previous embodiment in that the mobile wireless communications device 11" further includes a candy-bar form factor housing 16", a touch screen display 21", a plurality of convenience keys 19a"-19d" on the housing, and a virtual keyboard 17" on the touch screen display.

More specifically, in this particular embodiment, the plurality of different selectable keyboard configuration modes comprises a virtual keyboard on configuration mode and a virtual keyboard off configuration mode. Advantageously, the controller (not shown) is configured to selectively receive a respective set of data from among a plurality of different sets of data from the NFC device (not shown). For example, with the virtual keyboard 17" in an off mode, the controller may retrieve sets of data from the NFC device that may require a full screen, such as videos, pictures, etc., and with the virtual keyboard 17" in an on mode, the controller may retrieve sets of data from the NFC device that may require text input or that still may be readily viewed with reduced available screen size.

Figure 5:
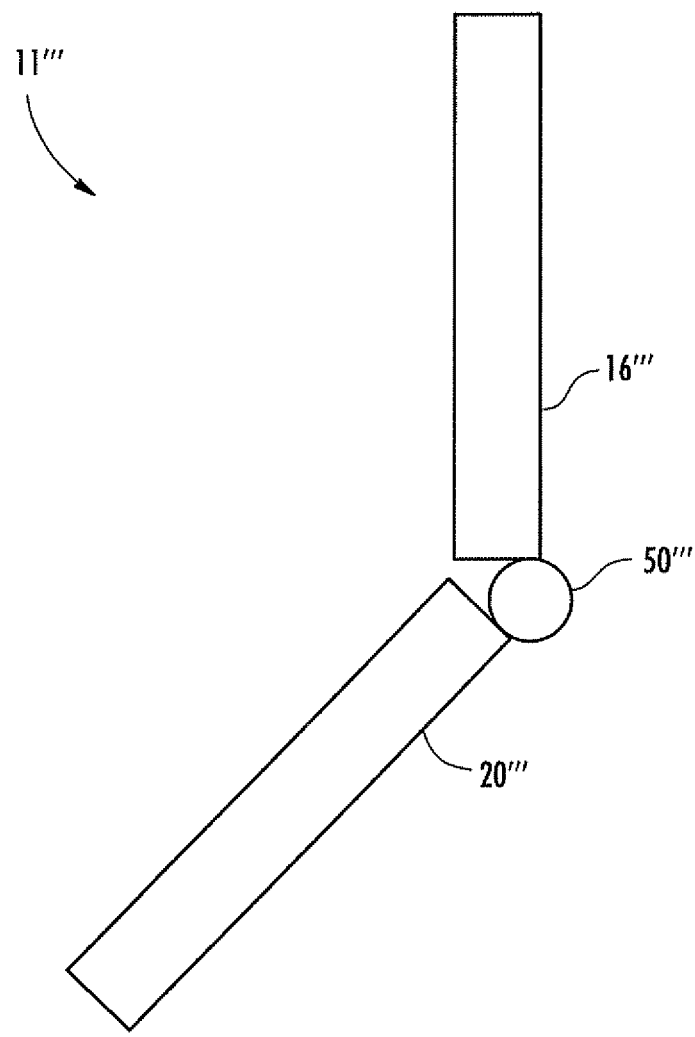
FIG. 5 is a side view of yet another example embodiment of a mobile wireless communications device.

Referring now to FIG. 5, another embodiment of the mobile wireless communications device 11''' is now described. In this embodiment of the mobile wireless communications device 11''', those elements already discussed above with respect to FIGS. 1-2 are given triple prime notation and most require no further discussion herein. This embodiment differs from the previous embodiment in that the mobile wireless communications device 11''' illustratively includes a first housing 20''' carrying the controller (not shown) and the NFC circuit (not shown), a second housing 16''', and a hinge 50''' coupling the first and second housings.

More specifically, in this particular embodiment, the plurality of different selectable keyboard configuration modes comprises a clamshell keyboard open configuration mode and a clamshell keyboard closed configuration mode. For example, with the mobile wireless communications device 11''' in clamshell open mode, the controller may retrieve sets of data from the NFC device (not shown) that may require a full screen, such as videos, pictures, etc., and with the mobile wireless communications device 11''' in a clamshell closed mode, the controller may retrieve sets of data from the NFC device that may be readily viewed with reduced screen real estate of the typical smaller status screen on the outer housing of the second housing 16'''.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
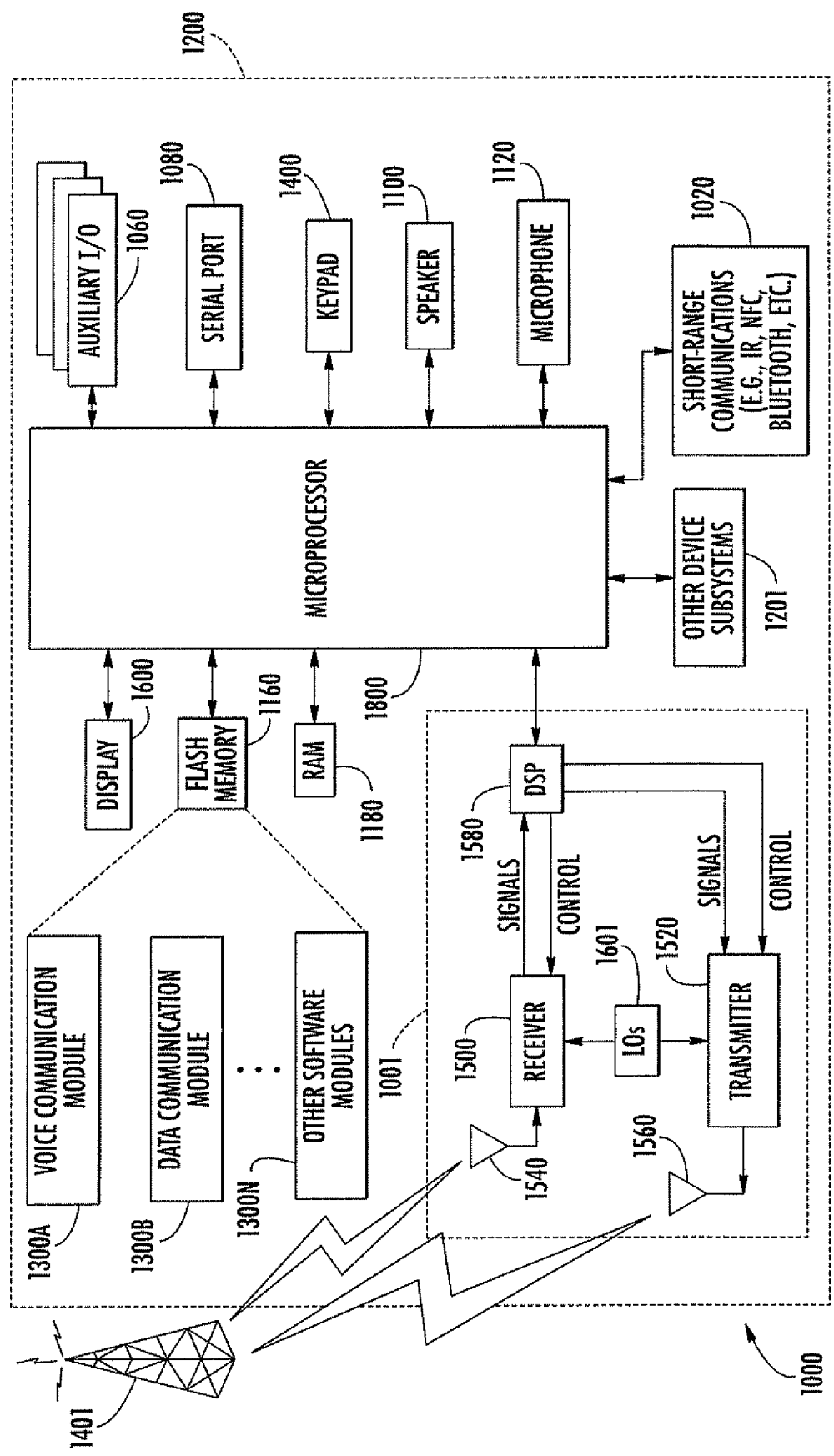
FIG. 6 is a schematic block diagram illustrating example components of a mobile wireless communications device that may be used with the wireless communication system of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or an NFC sensor for communicating with an NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device having a plurality of different selectable keyboard configuration modes and comprising:
   a near-field communication (NFC) circuit; and
   a controller coupled to said NFC circuit and configured to determine a selected keyboard configuration mode, and selectively communicate a respective set of data from among a plurality of different sets of data with at least one NFC device via NFC based upon the selected keyboard configuration mode, wherein the plurality of different sets of data comprises a text set of data and a picture set of data.

2. The mobile wireless communications device claim 1 wherein said controller is configured to receive the respective set of data from said at least one NFC device based upon the selected keyboard configuration mode.

3. The mobile wireless communications device of claim 1 wherein said controller is configured to transmit the respective set of data to said at least one NEC device based upon the selected keyboard configuration mode.

4. The mobile wireless communications device of claim 1 wherein the different sets of data are associated with a same subject matter.

5. The mobile wireless communications device of claim 1 wherein said controller is configured to:
   receive at least two different sets of data from the plurality of different sets;
   display a respective set of data from among the at least two different sets of data based upon the selected keyboard configuration mode; and
   store the other set of data from among the at least two different sets of data.

6. The mobile wireless communications device of claim 1 wherein said at least one NFC device is associated with a service position; and
   wherein the different sets of data are associated with the service position.

7. The mobile wireless communications device of claim 1 wherein said at least one mobile wireless communications device comprises a slider keyboard cooperating with said controller; and wherein the plurality of different selectable keyboard configuration modes comprises a slider keyboard open configuration mode and a slider keyboard closed configuration mode.

8. The mobile wireless communications device of claim 1 wherein said at least one mobile wireless communications device comprises a touch screen display; and wherein the plurality of different selectable keyboard configuration modes comprises a virtual keyboard configuration on mode and a virtual keyboard configuration off mode.

9. The mobile wireless communications device of claim 1 wherein said at least one mobile wireless communications device comprises a first housing carrying said controller and said NFC circuit, a second housing, a hinge coupling said first and second housings, and a clamshell keyboard cooperating with said controller; and
   wherein the plurality of different selectable keyboard configuration modes comprises a clamshell keyboard open configuration mode and a clamshell keyboard closed configuration mode.

10. A mobile wireless communications device operating in a plurality of different selectable keyboard configuration modes and comprising:
   a near-field communication (NFC) circuit; and
   a controller coupled to said NFC circuit and configured to determine a selected keyboard configuration mode, and selectively communicate a respective set of data from among a plurality of different sets of data with at least one NFC device via NFC based upon the selected keyboard configuration mode, wherein the plurality of different sets of data comprises a text set of data and a video set of data associated with a same subject matter.

11. The mobile wireless communications device of claim 10 wherein said controller is configured to receive the respective set of data from the at least one NFC device based upon the selected keyboard configuration mode.

12. The mobile wireless communications device of claim 10 wherein said controller is configured to transmit the respective set of data to the at least one NFC device based upon the selected keyboard configuration mode.

13. The mobile wireless communications device of claim 10 wherein said controller is configured to:
receive at least two different sets of data from the plurality of different sets;
display a respective set of data from among the at least two different sets of data based upon the selected keyboard configuration mode; and
store the other set of data from among the at least two different sets of data.

14. A method of operating a mobile wireless communications device having a plurality of different selectable keyboard configuration modes, the method comprising:
determining a selected keyboard configuration mode; and
selectively communicating a respective set of data from among a plurality of different sets of data with a near-field communication (NFC) device via NFC based upon the selected keyboard configuration mode, wherein the plurality of different sets of data cam rises a text set of data and a video set of data.

15. The method of claim 14 further comprising receiving the respective set of data from the NFC device based upon the selected keyboard configuration mode.

16. The method of claim 14 further comprising transmitting the respective set of data to the NFC device based upon the selected keyboard configuration mode.

17. The method of claim 14 wherein the different sets of data are associated with a same subject matter.

18. The method of claim 14 further comprising:
receiving at least two different sets of data from the plurality of different sets;
displaying a respective set of data from among the at least two different sets of data based upon the selected keyboard configuration mode; and
storing the other set of data from among the at least two different sets of data.

19. The method of claim 14 wherein the NFC device is associated with a service position; and wherein the different sets of data are associated with the service position.

20. The mobile wireless communications device of claim 1 wherein the picture set of data comprises a video set of data.

21. The method of claim 14 wherein the picture set of data comprises a video set of data.

* * * * *

UNITED STATES PATENT AND TRADEMARK OFFICE
CERTIFICATE OF CORRECTION

PATENT NO. : 8,737,914 B2  
APPLICATION NO. : 13/036532  
DATED : May 27, 2014  
INVENTOR(S) : Hill Page 1 of 1

It is certified that error appears in the above-identified patent and that said Letters Patent is hereby corrected as shown below:

In the Claims:

Column 8, Line 14    Insert: --of-- between "device" and "claim"

Column 8, Line 20    Delete: "NEC"  
                     Insert: --NFC--

Signed and Sealed this  
Second Day of September, 2014

Michelle K. Lee  
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,737,914 B2 |
| APPLICATION NO. | : 13/036532 |
| DATED | : May 27, 2014 |
| INVENTOR(S) | : Hill |

Page 1 of 1

It is certified that error appears in the above-identified patent and that said Letters Patent is hereby corrected as shown below:

IN THE CLAIMS:

Column 10, Line 3    Delete: "cam rises"
                     Insert: --comprises--

Signed and Sealed this
Sixth Day of January, 2015

Michelle K. Lee
*Deputy Director of the United States Patent and Trademark Office*